Feb. 14, 1933.                    E. G. STONE                    1,897,447
                    COTTON AND SORGHUM HEAD GATHERING DEVICE
                              Filed Jan. 16, 1929
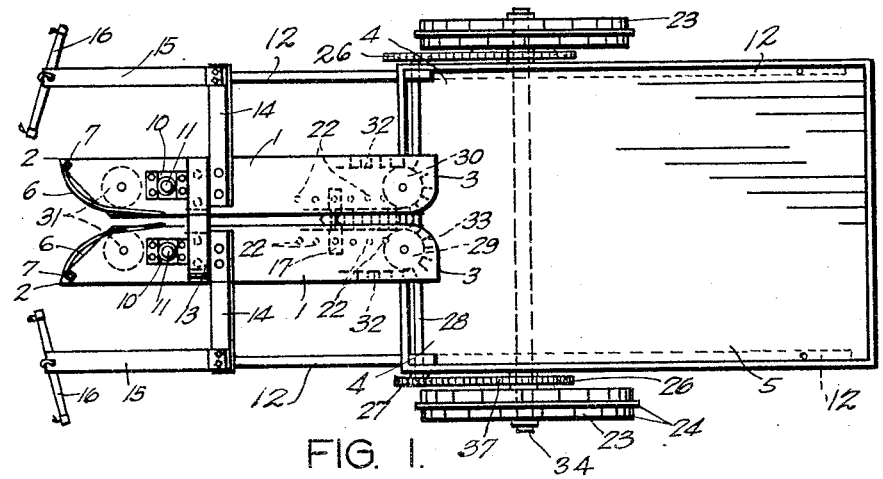
FIG. 1.
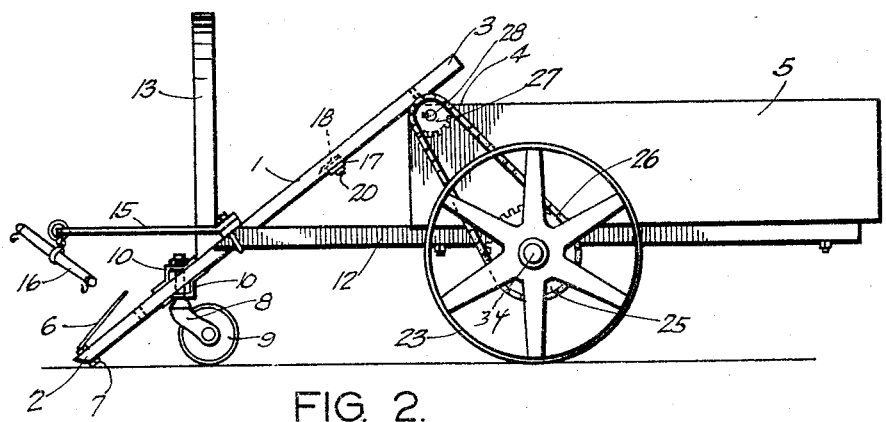
FIG. 2.
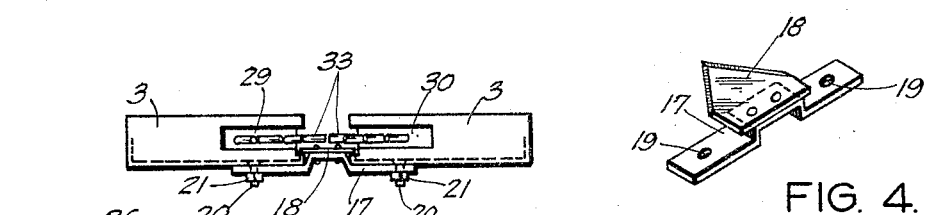
FIG. 3.                                                    FIG. 4.
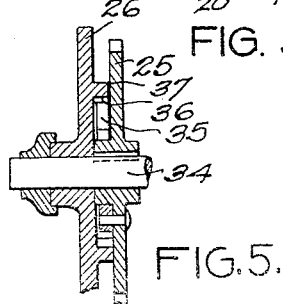
FIG. 5.        FIG. 6.
Enoch G. Stone INVENTOR
BY Loyal J. Miller
ATTORNEY Patented Feb. 14, 1933

1,897,447

UNITED STATES PATENT OFFICE

ENOCH G. STONE, OF YUKON, OKLAHOMA

COTTON AND SORGHUM HEAD GATHERING DEVICE

Application filed January 16, 1929. Serial No. 332,864.

My invention relates to a cotton and sorghum head harvesting machine.

The objects of my invention are to produce a device of the kind described which will be new, novel, efficient and of utility; which will be simple in construction and practical in application; which will be light and easy of draft; which can be cheaply manufactured and operated; which will be strong and durable; which is adapted to be drawn by a team of horses rather than pushed; which will be so balanced as to require but one pair of wheels aside from the caster wheels for the front portion; which will convey cotton gathered to a receptacle for carrying same; which provides guards for directing the cotton plants into proper position for being stripped; which provides a bracing means for supporting the guides used for conveying the cotton and sorghum heads and crops rearwardly and upwardly toward said receptacle; which will produce the result for which it is intended.

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is a plan view of the cotton gatherer; Fig. 2 is a side elevational view of the cotton gatherer; Fig. 3 is a rear end view of the gatherer showing cotton stem knife; Fig. 4 is a perspective view of the knife and holding bracket; Fig. 5 is a sectional view through one of the wheels showing the driving mechanism; and Fig. 6 is an elevational view of one of the wheel drums showing the driving mechanism.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

I am aware of the applications for patents for improvement in cotton harvester under Serial Number 176,449, dated March 7, 1927; and under Serial Number 239,413, dated December 12, 1927; and under Serial Number 284,607, dated June 11, 1928, each and all of which are for improvement in cotton harvesters and are applications of this applicant. I am not in this present application asking for a patent on the things covered by the said above referred to applications, but only desire to have a patent issued for the things which will be new over said applications.

A practical embodiment of the invention as illustrated in the drawing includes: I provide two parallel spaced arms 1 and lower ends 2 being disposed adjacent the ground when the device is in operation for gathering cotton; their rear ends 3 are adapted to be disposed adjacent and slightly above the front end 4 of a receiving chamber or receptacle 5. Adjacent the lower end 2 of said arms 1 I have provided guides fastened adjacent said ends by nut and bolt holding means 7. These may be differently positioned as desired. I also provide adjacent the front ends of said arms 1 casters 8 and caster wheels 9 for assisting in bearing the device in the field and for preventing the front ends of the arms from periodically plowing into the surface of the ground and to assist in carrying the whole device. Said caster is securely fastened to said arms by brackets 10 and bolt-heads 11. Said caster wheels run ordinarily on the ground and are a part of the device and help to balance and control the same. Two beams 12 extend from a point adjacent the rear end of said receptacle 5 to a point intermediate the ends 2 and 3 of said arms 1 and slightly above said casters joining on said arms. In order to make said device substantial I provide for the extending of said beams forward to a point adjacent the bracing member 13 connecting a lateral extension 14 from said arms joining with said beams 12. I provide forwardly extending from the joining of said lateral bracing members and said beams tongue members 15 and single-trees 16 thereon. As may be seen these are for the purpose of attaching the horses to said rig for drawing same and for harvesting and using it. Said bracing member 13 is in the form of a yoke and is substantially fastened at its ends to said arms, the head of the yoke being sufficiently high for the plants being harvested to pass therebetween. This gives the arms a substantial positioning and lessens the likelihood of their becoming racked and out of order. I also provide a U-shaped channel member 17 provided with a sickle-shaped double edged cutting knife 18 fastened to said U-shaped member. Said U-shaped member has holes 19 therein for fastening with bolts and nuts 20 and 21 to the back or under portion of said arms. Said U-shaped knife holding member 17 is adapted for being variously positioned through holes 22 in said arm members 1. I reserve the right to use other formed cutting blade than that shown in Fig. 4, such as: a double cutting edged blade in V-shape having the cutting surfaces on the inside of the V and the apex at the point of the V; and such as: a single cutting edge surface extending diagonally along a metallic blade member. The shortness and the lightness of the device as a whole and its being adapted to be drawn by a team of horses and having only two large wheels makes it much easier to turn at the end of the row than any of the other devices described in the applications hereinbefore referred to. I further provide a pair of wheels 23 having roughed and ribbed outer periphery 24 for contacting the dirt or ground between the rows of the crops being harvested. One of said wheels 23 is provided with a sprocket wheel or gear 25 disposed rigidly on shaft or gear 34 between said wheel and the bed or receptacle, said wheel is adapted to turn a sprocket chain 26 leading to a pinion wheel 27 adjacent the front end of the box or receptacle. While wheel 25 may be used as an ordinary sprocket wheel for operating the chain, my preference is to have it arranged as best seen in Figs. 5 and 6 so that the inner cog wheel 25 is not a part of the outside wheel 23 but is a separate gear keyed to shaft 34 and has dogs 35 engaging interior teeth 36 within a drum 37 integral with the near end of the hub of said wheel similar to the commonly used mower wheel, this is so that the machine may drive from both wheels, but at the same time permit the machine to be turned either way at the ends of the rows, and such like places, as desired. This principle is not claimed as new. Said pinion wheel 27 is keyed to a shaft 28 which is anchored in the upper front corner of said box or receptacle, said shaft 28 is provided with a pair of beveled gears rigidly fastened thereto, meshing with similar beveled gears on shafts at right angles to said first described shaft. On said shafts last described I provide sprocket wheels 29 and 30 fastened to said arms 1. Said sprocket wheel 30 and companion wheels 31 are all adapted to revolve in the plane of said arms 1 and a toothed sprocket chain 32 having teeth 33 is adapted to run on said sprocket wheels 30 and sprocket wheels 31, the said two sets of said sprocket wheels being adapted to run one to the right and one to the left of the device between said arms so as to carry the cotton gathered and cut upwardly and rearwardly to the said box or receptacle 5.

I have not described in detail the manner of the elevating of the cotton gathered or the other crops cut, in this application since in my application made on the 12" day of December, 1927; and the application made on the 11" day of June, 1928, I have more fully described these details and in such respects no improvement thereover is claimed in this present application.

It is to be understood that I claim certain latitude and breadth of positioning of the knife 18 at various heights without departing from the principle of my invention.

In operation it will be seen by those familiar with the art to which my invention pertains that the horses will be placed between the rows, and that the device will straddle the row between the said horses, and that in the gathering of cotton crops the lower end of said arms 1 will be permitted to be adjacent the ground. The lower ends of said arms are kept off the ground by the casters 8 and the caster wheels 9. Guards 6 adjacent the front ends 2 of said arms will assist in guiding the cotton plants into the channel between said arms 1. The drawing forward of the device will cause the rough surfaces of wheels 23 to contact the surface of the dirt and turn sprocket wheel 25 and chain 26 on pinion 27 revolving shaft 28 and bevel gears thereon connecting with other beveled gears thereabove and turning horizontally disposed sprocket wheels 30 and 31 carrying sprocket chain 32 with spikes 33 thereon upwardly and rearwardly along the longitudinal length of said arms and said spikes will comb the cotton off of the plants carrying the same upwardly and rearwardly to the bed or receptacle 5. After the cotton is combed from the plants by the spikes 33 on the conveyors, some of the complete bolls together with their stems will be combed from the plant. In this case the spikes firmly hold the bolls with their stems projecting downwardly and thus convey them upwardly past said knives 18 which sever the stems from the bolls.

When operating the device the bolls picked by the spikes will be carried past said knife 18, which will sever any stems which are thereto attached.

Having thus described my invention what is claimed and desired to be secured by Letters Patent is:

1. A device of the class described, having in combination, a vehicle having a box mounted on a pair of wheels adapted to be drawn, a pair of inclined parallel arms mounted on said wheels, a pair of endless chain conveyors operating in opposite directions and disposed on said parallel arms for gathering plant products from growing plants and conveying the gathered products to said box, said inclined arms having guards adjacent their lower ends for guiding plants therebetween, and having a knife adjacent and between said conveyors for severing from the gathered products any stems which may have been inadvertently gathered therewith, said wheels adapted to propel said conveyors.

2. A device of the class described, having in combination, a vehicle having a box mounted on a pair of wheels adapted to be drawn, a pair of inclined parallel arms mounted on said wheels, a pair of endless chain conveyors operating in opposite directions and disposed on said parallel arms for gathering and conveying gathered plant products to said box, said inclined arms having guards adjacent their lower ends for guiding plants therebetween, said wheels adapted to propel said conveyors, and a double edged cutting member rigidly mounted on a bar between said arms, said member for severing any stems which may have been inadvertently gathered with said plant product as the product is being conveyed upwardly and rearwardly thereover by said conveyors, said bar disposed on said arms rigidly yet in a manner adjustable as to different heights.

3. A device of the class described, having in combination, a vehicle having a box mounted on a pair of wheels and adapted to be drawn, a pair of inclined parallel arms mounted on said wheels, a pair of endless crop gathering and elevating conveyors operated in opposite directions and disposed on said parallel arms, said conveyors traveling on the same plane and having outstanding fingers disposed toward each other for gathering plant products from growing plants and conveying the product to said box, the front ends of said arms having guards for guiding plants therebetween, said arms carrying a knife adjacent and between said conveyors for severing from the gathered plant product any stems which may have been inadvertently gathered therewith and for cutting heads from grain sorghums, and means operating with said wheels for propelling said conveyors.

4. A device of the class described, having in combination, a vehicle having a box mounted on a pair of wheels and adapted to be drawn, a pair of inclined parallel arms mounted on said wheels, a pair of endless crop gathering conveyors operating in opposite directions, said conveyors disposed on said parallel arms for gathering and conveying gathered plant product to said box, said arms having their lower ends provided with guards for guiding plants therebetween, and having a means for holding them rigidly against relative lateral movement, said conveyors adapted to be propelled by the traction of said wheels upon the earth, and a double edged cutting member mounted between and below said arms upon a cross-bar, said bar disposed on said arms in a manner adjustable to different heights, said cutting member adapted to cut inadvertently gathered stems from the gathered plant products as said products are being conveyed thereover by said conveyors.

5. The combination with a vehicle having a box mounted on a pair of wheels and adapted to be drawn, of a pair of inclined parallel arms mounted on said wheels, a pair of endless crop gathering and elevating conveyors operating in opposite directions by the traction of the vehicle wheels upon the earth, said conveyors disposed on said parallel arms and adapted to convey gathered plant products to said box, a yoke member extending upwardly above said crop being harvested for holding said arms against relative lateral movement, said arms having supporting casters disposed at their lower ends and each having a guard adjacent its lower end for guiding plants therebetween.

6. The combination with a vehicle having a box mounted on a pair of wheels and adapted to be drawn, of a pair of inclined parallel arms mounted on said wheels, a pair of crop gathering endless chain conveyors operating in opposite directions by the traction of the vehicle wheels upon the earth, said conveyors disposed on said parallel arms for gathering and conveying gathered crop product to said box, a yoke member extending upwardly above the crop being harvested and adapted to hold said arms against relative lateral movement, the lower ends of said arms having supporting casters and each having a guard for guiding plants therebetween, and a double edged cutting member mounted upon a bar beneath and between said arms, said bar disposed upon said arms in a manner adjustable to different heights, said cutting member for cutting stems which may have been inadvertently gathered with said product from the product as said product is being conveyed upwardly thereover by said conveyors.

7. In a crop gathering device the combination with a wheeled vehicle having a pair of parallel sloping arms at its front end, said arms operably supporting upwardly and rearwardly traveling conveyors, and with means for driving said conveyors, of a knife rigidly yet adjustably disposed between and beneath said arms whereby stems of a plant product are severed from the product after the conveyors have stripped the product from the plant and as the product is carried upwardly by said conveyors.

8. A cotton harvester, embodying a vehicle having in combination, a flat bottomed box having perpendicular walls, a pair of wheels supporting said box, a pair of endless, fingered conveyors traveling in opposite directions in the same plane, said conveyors mounted in an inclined manner with their front lower ends barely clearing the ground and with their rear upper ends projecting over the front wall of said box, the fingers of one conveyor projecting toward the fingers of the other, said fingers for pulling the cotton from the cotton plant and conveying the gathered cotton to said box, and a stationary cutting blade mounted adjacent said conveyors and in a plane parallel therewith for severing from the cotton as it is being conveyed upwardly, any stems which may have been inadvertently gathered.

9. A cotton harvester, embodying a vehicle having in combination, a flat bottomed box having perpendicular walls, a pair of wheels supporting said box, a pair of endless, fingered conveyors traveling in opposite directions in the same plane, said conveyors mounted in an inclined manner with their front lower ends barely clearing the ground and with their rear upper ends projecting over the front wall of said box, the fingers of one conveyor projecting toward the fingers of the other, said fingers for pulling the cotton from the cotton plant and conveying the gathered cotton to said box, and a double edged cutting blade mounted beneath and between said conveyors for severing from the cotton as it is being conveyed upwardly, any stems which may have been inadvertently gathered.

ENOCH G. STONE.